Patented Sept. 6, 1932

1,875,530

UNITED STATES PATENT OFFICE

FERDINAND A. VAUPOTIC, OF BROOKLYN, NEW YORK, ASSIGNOR TO COMMERCIAL SOLVENTS CORPORATION, OF TERRE HAUTE, INDIANA, A CORPORATION OF MARYLAND

VANISHING CREAM

No Drawing.    Application filed December 4, 1929.    Serial No. 411,680.

My invention relates to improvements in cosmetic preparations. More specifically, my invention relates to the manufacture of improved vanishing creams containing alkyl esters of higher fatty acids.

Vanishing creams, as compounded at present, consist essentially in an emulsion in water of partially neutralized stearic acid. The stearic acid, usually the pure triple pressed acid, is melted and is then partially neutralized by the addition of an alkali, usually potash. The alkali is added in the form of a concentrated solution while maintaining the acid at a temperature somewhat above the melting point. After the alkali has been added, the water, containing the desired amount of glycerine, is added with constant agitation. The saponified portion of the acid serves to emulsify the remaining free acid when the water is added. After all the water has been added, the emulsion is beaten to the desired consistency, bulk, and aeration. At this point the perfume is beaten into the cream, usually in the form of an alcoholic solution.

Vanishing creams of this type possess certain undesirable features which are not encountered in my new and improved creams. The glycerine in the creams as formulated at present constitutes an objectionable feature due to its hygroscopic nature. On days of excessive humidity the glycerine is likely to absorb relatively large amounts of atmospheric moisture, producing a wet, sticky feeling on the epidermal surface to which the cream has been applied. Furthermore, on days of exceedingly low humidity the glycerine may absorb moisture from the skin. This feature is especially objectionable when the creams are used on normally dry skins.

I have found that by the substitution of alkyl esters, especially butyl esters, of the higher fatty acids for the glycerine, this difficulty is obviated: for the esters are not only non-hygroscopic, but are water insoluble. A softer, finer texture is imparted to the creams in which the esters are used, and the "feel" of these creams has been found to be superior to that of the glycerine creams. This is to be expected since the esters, being insoluble in water, will be in the stearic acid phase of the emulsion, and after the evaporation of the water a homogeneous film will remain. In the case of glycerine, the opposite will be true since the glycerine will be in the water phase of the emulsion. An additional advantage in the use of the esters is the fact that less ester than glycerine is required to give a cream of the same texture and "feel".

The esters which I have found to be satisfactory for use in vanishing creams are the alkyl esters, such as the ethyl, propyl, or butyl esters, of the higher fatty acids. By the term "higher fatty acids", both the saturated acids, such as lauric, palmitic, and stearic, and the unsaturated acids, such as hypogæic oleic, and linoleic are meant to be included. I prefer to use the alkyl stearates, especially butyl stearate, and the alkyl esters, especially the butyl esters, of the mixed fatty acids of vegetable oils such as palm oil, coconut oil, corn oil, peanut oil, or cotton-seed oil. The use of these esters in vanishing creams may best be illustrated by the following example.

Thirteen kilos of "XXX" stearic acid are melted and decanted from any dirt which may be present. The acid is held at 75° to 80° C. while one kilo of 50% potash solution is added with constant agitation. One and one-half kilos of butyl stearate are then added. After these materials have been well mixed and a homogeneous mass is obtained, sixty liters of water are added. The water should be preheated to 75° C. and the mixture held at 75° C. and constantly agitated during the addition. After all the water has been added the emulsion is allowed to cool but is beaten constantly until cold. At this point the desired perfume is added and well beaten into the mixture.

Using the general procedure of the above example, the number of formulæ in which the butyl esters may be employed is legion. The following are a few representative type formulæ in which these esters may be satisfactorily used:

(I)

| | |
|---|---|
| Stearic acid XXX | 26 kilos |
| Potassium hydroxide (sticks) | 1 kilo |
| Butyl ester of coconut oil fatty acids | 3 kilos |
| Water | 120 liters |
| Perfume | as desired |

(II)

| | |
|---|---|
| Stearic acid XXX | 18 kilos |
| Potassium carbonate crystals | 1.2 kilos |
| Butyl stearate | 2.5 kilos |
| Water | 75 liters |
| Perfume | as desired |

(III)

| | |
|---|---|
| Stearic acid XXX | 18 kilos |
| Caustic soda (50%) | 1.8 kilos |
| Butyl ester of palm oil fatty acids | 2.5 kilos |
| Water | 76 liters |
| Perfume | as desired |

(IV)

| | |
|---|---|
| Stearic acid XXX | 12 kilos |
| Sodium carbonate crystals | 9 kilos |
| Borax | 0.6 kilo |
| Butyl stearate | 5 kilos |
| Water | 36 liters |
| Perfume | as desired |

Although any alkaline material such as caustic soda, potassium carbonate, borax, or ammonia water may be used for the partial neutralization of the stearic acid, the hydroxides are to be preferred, especially potassium hydroxide. Any desired perfume may be incorporated in these creams. Some of the most common materials which may be used for this purpose are rose oil, ylang-ylang oil, terpineol, musk, heliotropin, methyl acetophenone, benzylidene acetone, and the like. These materials are usually added in the form of a solution in five to ten volumes of alcohol. Distilled extract of witch hazel may be substituted for all of the perfume and part of the water in the creams. Fats such as cacao butter, almond oil, or hard tallow, waxes such as lanolin, spermacetti, or beeswax, and gums such as benzoin or tragacanth may be incorporated in the creams if desired.

The proportion of ester to be used in any cream will, of course, depend to some extent upon the other ingredients and their relative proportions. For example, more of the ester may be used in an ammonia cream than in a potash cream. Although I prefer to use no glycerine at all, in some cases it may be preferred to substitute the esters for only a part of the glycerine, thus cutting down the proportion of ester used. In general, however, the esters may be employed in proportions of from 1 to 100 parts per 100 parts of stearic acid, and in most cases from 5 to 15 parts per 100 parts of stearic acid will be found to be satisfactory.

Thus it is seen that my invention can be utilized in a great many modifications, and it is to be understood that it is to be limited in no degree to the use of the specific substances or combinations mentioned in the above disclosure.

Now, having described my invention, what I claim is:

1. A vanishing cream containing alkyl ester of a higher fatty acid.

2. A vanishing cream containing alkyl esters of the fatty acids of vegetable oils.

3. A vanishing cream containing ester selected from the group consisting of alkyl stearates and the alkyl esters of the fatty acids of coconut oil, palm oil, corn oil, and cottonseed oil.

4. A vanishing cream containing ester selected from the group consisting of butyl stearate and the butyl esters of the fatty acids of coconut oil, palm oil, corn oil, and cottonseed oil.

5. A composition of matter comprising a stearic acid soap, water, and an alkyl ester of a higher fatty acid.

6. A composition of matter comprising a stearic acid soap, water, and alkyl esters of the fatty acids of vegetable oils.

7. A composition of matter comprising a stearic acid soap, water, and an ester selected from the group consisting of alkyl stearates and the alkyl esters of the fatty acids of coconut oil, palm oil, corn oil, and cottonseed oil.

8. A composition of matter comprising a stearic acid soap, water, and an ester selected from the group consisting of butyl stearate and the butyl esters of the fatty acids of coconut oil, palm oil, corn oil, and cottonseed oil.

9. A composition of matter comprising a stearic acid soap, water, perfume, and an ester selected from the group consisting of alkyl stearates and the alkyl esters of the fatty acids of coconut oil, palm oil, corn oil, and cottonseed oil.

10. A composition of matter comprising a stearic acid soap, water, perfume, and an ester selected from the group consisting of butyl stearate and the butyl esters of the fatty acids of coconut oil, palm oil, corn oil, and cottonseed oil.

In testimony whereof I affix my signature.

FERDINAND A. VAUPOTIC.